3,576,792
Patented Apr. 27, 1971

3,576,792
DITHIOLETHIONESULFENAMIDES AS VULCANIZATION ACCELERATORS
Joseph Patrick Brown, Bryn Castell, Geufron, Llangollen, Wales, assignor to Monsanto Chemicals Limited, London, England
No Drawing. Filed Sept. 25, 1968, Ser. No. 762,619
Claims priority, application Great Britain, Sept. 26, 1967, 43,770/67
Int. Cl. C08f 27/06
U.S. Cl. 260—79.5                  3 Claims

ABSTRACT OF THE DISCLOSURE

New compounds of the formula

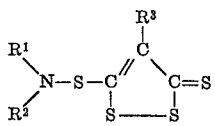

where $R^1$ represents a hydrogen atom or an aliphatic group, $R^2$ represents an aliphatic group, or where $R^1$ and $R^2$ taken together with the nitrogen atom represent a saturated ring, and $R^3$ represents an aliphatic or aromatic group are described which are useful for accelerating the vulcanization of rubber.

---

This invention relates to new sulfur-containing heterocyclic compounds, more particularly to new sulfenamides that are useful as accelerators for the vulcanization of rubber.

The new compounds have the general formula:

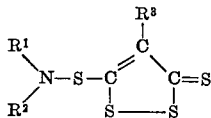

where $R^1$ represents a hydrogen atom or an aliphatic group, $R^2$ represents an aliphatic group, or where $R^1$ and $R^2$ taken together with the nitrogen atom represent a saturated ring, and $R^3$ represents an aliphatic or aromatic group.

The compounds can be prepared by the reaction of an N-halo-amine having the formula:

where $R^1$ and $R^2$ have the same significance as in the formula of the new compounds above and X is a halogen atom, usually a chlorine atom, with a mercaptan having the formula:

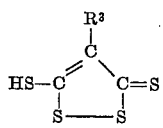

where $R^3$ has the same significance as in the formula of the new compounds above, in the presence of an acid acceptor.

The term "aliphatic" used with reference to the group $R^1$ and $R^2$ is intended to include cycloaliphatic, and examples of such groups thus include alkyl, substituted alkyl (including aralkyl), cycloalkyl, and substituted cycloalkyl groups. Where $R^1$ or $R^2$ represents an alkyl group, this can have either a straight or branched chain but is preferably one containing not more than 6 carbon atoms, for instance an ethyl, isopropyl, tert-butyl, or n-hexyl group. Examples of substituted alkyl groups are benzyl and beta-cyanoethyl. In preferred compounds, the total number of carbon atoms in $R^1$ and $R^2$ is at least 4.

Cycloalkyl groups from which $R^1$ and $R^2$ can be selected include cyclopentyl, cyclohexyl, and alkyl-substituted cyclopentyl, and cyclohexyl groups containing up to 10 carbon atoms. Where $R^1$ and $R^2$ form a saturated ring with the nitrogen atom, this is generally a 5-, 6-, or 7- membered ring, one of which can be oxygen or sulfur. One or more alkyl substituents may be present in the ring but the total number of carbon atoms in the cyclic radical $R^1R^2N$ does not usually exceed 10. Examples of such rings are pyrrolidino, piperidino, hexamethylenimino, morpholino, thiomorpholino, and 2,6-dimethylmorpholino.

Where $R^3$ is the above formula represents an aliphatic group, this is usually an alkyl group having a straight or branched chain and containing up to 10 carbon atoms, for example a methyl, ethyl, isopropyl, neopentyl, hexyl, octyl, or decyl group. An aromatic group $R^3$ is usually an aryl or substituted aryl group, and more particularly a phenyl or substituted phenyl group, for instance a halophenyl or alkoxyphenyl group.

Specific examples of the new compounds of the invention are:

N,N-diethyl-4-phenyl-1,2-dithiole-3-thione-5-sulfenamide
N,N-diisopropyl-4-phenyl-1,2-dithiole-3-thione-5-sulfenamide
N-tert-butyl-4-phenyl-1,2-dithiole-3-thiole-5-sulfenamide
N-cyclohexyl-4-phenyl-1,2-dithiole-3-thione-5-sulfenamide
N,N-dicyclohexyl-4-phenyl-1,2-dithiole-3-thione-5-sulfenamide
5-morpholinothio-4-phenyl-1,2-dithiole-4-thione
5-(2,6-dimethylmorpholinothio)-4-phenyl-1,2-dithiole-3-thione
5-hexamethyleniminothio-4-phenyl-1,2-dithiole-3-thione, and the analogous 4-neopentyl compounds.

The acid acceptor used in the process of the invention can be, for example, a tertiary organic base, for example, pyridine, a trialkylamine, or a dialkylaniline but is preferably the amine corresponding to the N-halo-amine used in the reaction. Inorganic acid acceptors are less preferred but can be used. The reaction system can include an inert organic diluent, for example, ether, dioxan, benzene, chlorobenzene, chloroform, or carbon tetrachloride. The reaction occurs at room temperature, and in practice ambient conditions for the process are therefore normally employed. More generally, temperatures of from 0° to 100° C. are suitable. The mercaptans useful as starting materials for the production of the new compounds of the present invention can be produced by the method described and claimed in British patent specification No. 1,049,639, in which specification certain of the mercaptans are themselves claimed as new compounds.

The new sulfenamides of the present invention can be used as accelerators in the vulcanization of natural and synthetic sulfur-vulcanizable rubbers. Synthetic rubbers that can be vulcanized include polymers of 1,3-butadienes, for instance 1,3-butadiene itself and of isoprene, copolymers of 1,3-butadienes with other monomers such as styrene, acrylonitrile, isobutylene, or methyl methacrylate, and polyolefin rubbers, for instance ethylene-propylene diene-modified terpolymers.

In the vulcanization process, the accelerators are usually used in conjunction with sulfur or a sulfur-containing vulcanizing agent, for example an amine disulfide or thiuram sulfide, and with other commonly used ingredients, for example, zinc oxide, stearic acid, a filler, and an antioxidant.

The additives can be incorporated into unvulcanized rubber by conventional means, using for example an internal mixer or a roll mill, or by adding a solution or suspension to a rubber latex, giving a mixture which is subsequently vulcanized at an elevated temperature. This temperature is one that is appropriate to the particular rubber concerned, for example, a temperature in the range of 135°–155° C. where the composition is based on natural rubber, or a temperature in the range of 140°–160° C. where the composition is based on a styrene-butadiene rubber.

The amount of accelerator used depends on a number of factors, including for example the type of rubber and the use for which the vulcanized product is required. The amount is, however, usually within the range of 0.3 to 5 parts by weight, and more especially within the range of 0.3 to 2 parts by weight, per 100 parts by weight of rubber, for example 0.5, 1.0, and 1.5 parts by weight.

Conventional amounts of the other additives referred to above can be used.

The invention is illustrated by the following examples:

EXAMPLE 1

This example describes the preparation of 5-(4-morpholinothio)-4-phenyl-1,2-dithiole-3-thione.

A solution of 110 cc. of sodium hypochlorite containing 14.9% by weight of active chlorine was diluted to 300 cc. and cooled to 0° C. To the solution was added at 0° C. over half an hour 39 cc. of morpholine in 100 cc. of water. The clear solution was extracted with 500 cc. of ether and the ethereal extract containing N-chloromorpholine was then dried over sodium sulfate. After filtering, the solution was mixed with a cold solution of 10 grams of 5-mercapto-4-phenyl-1,2-dithiole-3-thione in 150 cc. of morpholine. Next day, a mixed product of yellowish needles and small orange crystals was filtered off and the needles, which were presumably morpholine hydrochloride, were removed with water to leave 5.5 grams of orange crystals having a melting point of 153°–154° C. Recrystallization from 220 cc. of methyl ethyl ketone gave 3.4 grams of orange plates which had a melting point, after further recrystallization from toluene, of 178°–180° C. Analysis of the product gave 47.9% carbon, 4.0% hydrogen, 3.9% nitrogen, and 35.8% sulfur as compared to 47.8% carbon, 4.0% hydrogen, 4.3% nitrogen, and 39.2% sulfur calculated for $C_{13}H_{13}NOS_4$.

EXAMPLE 2

This example illustrates the use of 5-(4-morpholinothio)-4-phenyl-1,2-dithiole-3-thione as an accelerator in the vulcanization of rubber and describes the methods employed to assess its effectiveness.

A masterbatch of the following composition was prepared by compounding on a mill:

| | Parts by weight |
|---|---|
| Pale crepe | 100 |
| Zinc oxide | 3 |
| Stearic acid | 1 |
| Sulfur | 2.5 |

The test compound was then incorporated into a portion of the masterbatch at a level equivalent to 2 parts by weight per 100 parts by weight of the rubber. A further portion of the masterbatch was used as a control. Each mix was allowed to stand for 24 hours before being tested:

In one test method, a sample of the mix under test was placed in a Mooney plastometer fitted with a "large" rotor, according to British Standard Specification No. 1673, part 3, 1951. The time taken for the reading of the instrument to increase to 100 units was recorded, this time being inversely related to the accelerator activity of the compound under test.

In a second test method, the degree of vulcanization of a mix after various cure times at 164° C. was determined by measuring the extent to which a cured sample swelled on immersion in benzene for 24 hours at room temperature, the extent of swelling being inversely proportional to the degree of vulcanization. The procedure was that of British Standard Specification 903, part A16, Method C, using strips cured in 1 mm. x ½" x 4" molds.

The results given in the following table show the marked accelerator activity of the test compound:

| Accelerator | Mooney plastometer time (in minutes) to reach 100 units at 140° C. | Percent linear swelling in benzene after various cure times at a temperature of 164° C., minutes | | |
|---|---|---|---|---|
| | | 5 | 15 | 30 |
| 5-(4-morphlinothio)-4-phenyl-1,2-dithiole-3-thione | 11.25 | 72 | 71 | 78 |
| Blank | 120 | 150 | 120 | 110 |

It is intended to cover all changes and modifications of the examples of the invention herein chosen for purposes of disclosure which do not constitute departures from the spirit and scope of the invention. The matter contained in each of the following claims is to be read as part of the general description of the present invention.

What is claimed is:

1. A process for the vulcanization of a sulfur-vulcanizable rubber, in which a compound is used as a vulcanization accelerator which compound has the formula

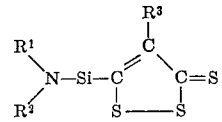

wherein $R^1$ is hydrogen, lower alkyl, cyano-substituted lower alkyl, phenyl substituted lower alkyl, cyclopentyl, cyclohexyl, alkylcyclopentyl containing up to 10 carbon atoms, akylcyclohexyl containing up to 10 carbon atoms; $R^2$ is lower alkyl, cyano substituted lower alkyl, phenyl substituted lower alkyl, cyclopentyl, cyclohexyl, alkylcyclopentyl containing up to 10 carbon atoms, alkylcyclohexyl containing up to 10 carbon atoms, or $R^1$ and $R^2$ taken together with the nitrogen represent pyrrolidino, piperidino, hexamethylenimino, morpholino, thiomorpholino or 2,6-dimethylmorpholino; and $R^3$ is alkyl containing up to 10 carbon atoms, phenyl halophenyl, or alkoxyphenyl.

2. A process according to claim 1 in which the accelerator is 5-(4-morpholinothio)-4-phenyl-1,2-dithiole-3-thione.

3. A process according to claim 2 in which the amount of accelerator used is from 0.3 to 2 parts by weight per 100 parts by weight of rubber.

References Cited

UNITED STATES PATENTS 3,047,546   7/1962   Lober _____ 260—79.5
3,149,107   9/1964   Hatchard _____ 260—247.1

FOREIGN PATENTS 1,049,637   11/1966   Great Britain _____ 260—327

JAMES A. SEIDLECK, Primary Examiner

C. A. HENDERSON, Jr., Assistant Examiner

U.S. Cl. X.R.

260—247.1, 293.4, 326.82, 327, 784

UNITED STATES PATENT OFFICE
CERTIFICATE OF CORRECTION

Patent No. 3,576,792      Dated April 27, 1971

Inventor(s) Joseph Patrick Brown

It is certified that error appears in the above-identified paten and that said Letters Patent are hereby corrected as shown below:

Column 2, line 32, "4-thione" should read "3-thione".

Column 4, line 34, in the formula delete the "i" in "Si" so that the formula reads:

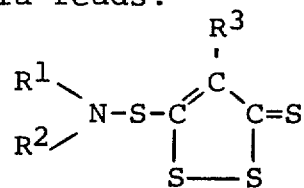

Column 4, line 39, "akylcyclohexyl" should read "alkylcyclohexyl".

Signed and sealed this 28th day of December 1971.

(SEAL)
Attest:

EDWARD M. FLETCHER, JR.      ROBERT GOTTSCHALK
Attesting Officer      Acting Commissioner of Pat